(12) United States Patent
Kang et al.

(10) Patent No.: US 11,243,913 B1
(45) Date of Patent: Feb. 8, 2022

(54) SYSTEM AND METHODS FOR PRE-POPULATING SERVICE DATA INDICATION ON USER INTERFACE

(71) Applicant: COUPANG CORP., Seoul (KR)

(72) Inventors: Ku Kang, Seoul (KR); JungJoon Park, Seoul (KR); Duhyeong Kim, Seoul (KR); Tae Il Kim, Seoul (KR); Ki Woong Jang, Seoul (KR); Prakash Kadel, Seoul (KR); Seongwook Ahn, Seoul (KR); Kyung Hoon Min, Seoul (KR); Nam Yeong Goo, Seoul (KR); Yilu Shen, Seoul (KR); Li Li, Seoul (KR); Juan Qu, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/101,055

(22) Filed: Nov. 23, 2020

(51) Int. Cl.
*G06F 7/02* (2006.01)
*G06F 16/00* (2019.01)
*G06F 16/14* (2019.01)
*G06F 16/21* (2019.01)
*G06F 16/22* (2019.01)
*G06F 3/0482* (2013.01)

(52) U.S. Cl.
CPC .......... *G06F 16/156* (2019.01); *G06F 3/0482* (2013.01); *G06F 16/21* (2019.01); *G06F 16/2228* (2019.01)

(58) Field of Classification Search
CPC ...... G06F 16/156; G06F 16/168; G06F 16/21; G06F 16/2228; G06F 3/048; G06F 3/0482; G06Q 30/00; G06Q 30/0641; G06Q 30/0643
See application file for complete search history.

(56) References Cited

U.S. PATENT DOCUMENTS

| | | | |
|---|---|---|---|
| 6,023,683 A * | 2/2000 | Johnson | G06Q 10/087 705/1.1 |
| 8,812,981 B1 | 8/2014 | Iten et al. | |
| 2004/0193746 A1 | 9/2004 | Koyama | |
| 2009/0319947 A1 | 12/2009 | Wang et al. | |

(Continued)

OTHER PUBLICATIONS

International Search Report and Written Opinion in PCT Application No. PCT/IB2020/061283, dated Aug. 18, 2021 (8 pages).

*Primary Examiner* — Bruce M Moser
(74) *Attorney, Agent, or Firm* — Finnegan, Henderson, Farabow, Garrett & Dunner LLP

(57) ABSTRACT

A method for generating graphic display interface, comprising: receiving an request to generate a graphic display interface comprising at least a client ID; generating a plurality of graphic data structures based on at least one of the request or a priority list, each of the graphic data structures corresponding to a identifier; associating for each of the graphic data structures, an item graphic; tagging each of the graphic data structures with one or more tags, the tagging comprises: determine that the client ID matches at least one member ID; and determine, for each of the graphic data structures, that the associated identifier has a first status, and tagging the graphic data structures with a first tag upon the determination; and associating for each of the graphic data structures based on the associated tags, one of a plurality of service graphics; and generating instruction for the graphic display interface.

19 Claims, 11 Drawing Sheets

(56) References Cited

U.S. PATENT DOCUMENTS

| | | |
|---|---|---|
| 2011/0099494 A1 | 4/2011 | Yan et al. |
| 2016/0042402 A1* | 2/2016 | Gadre ................ G06Q 30/0276 |
| | | 705/14.66 |
| 2017/0018031 A1* | 1/2017 | Bandy .................... G06F 16/22 |
| 2019/0373412 A1* | 12/2019 | Subramanian ..... G06Q 30/0611 |
| 2020/0160428 A1 | 5/2020 | Calvo et al. |

* cited by examiner

Favorites  Application                                           login  Sign Up  Service center

[all]

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese

285 Reviews    20,000 won

FREE Shipping
Tomorrow (Wed) 11/28 Arrival Guarantee

Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

FIG. 1C

SYSTEM AND METHODS FOR PRE-POPULATING SERVICE DATA INDICATION ON USER INTERFACE

TECHNICAL FIELD

The present disclosure generally relates to computerized systems and methods for generating user interfaces containing visual elements. In particular, embodiments of the present disclosure relate to inventive and unconventional systems relate to generation of visual elements that improve the overall efficiency of user interfaces and user experiences.

BACKGROUND

On-line shopping business often rely on a variety of user interfaces for interactions with potential shoppers. These interfaces may be web pages displayed on the devices of the shoppers. The web pages may contain text, image, video, animation, and/or other graphic and visual elements, some of which may allow interactions with the shoppers. These graphic elements present to the shoppers, information that the on-line shopping business desires to convey. For example, web pages may show items available for purchase, along with price, quantity, review, and other information associated with each of the items.

Existing system may be limited in its ability to generate user interfaces that contain representations of all information relevant to potential shoppers. Moreover, the benefits of a fully integrated back-end system of the on-line business may not be sufficiently appreciated by the shopper if the information produced are not readily available for viewing, or if presented in a manner that is overwhelming. For example, if the shopper is interested in certain features of the shopping experience, it may be inefficient to require the shopper to make an additional interaction just to view whether the features are available for certain items.

Therefore, there is a need for improved methods and systems to generate user interfaces containing graphic elements that improve efficiency and utility of user interfaces and user experiences.

SUMMARY

One aspect of the present disclosure is directed to a computerized method for generating graphic display interface, comprising: receiving, by a computing system, an request to generate a graphic display interface, the request comprising at least a client ID; generating, by the computing system, a plurality of graphic data structures based on at least one of the request or a priority list, each of the graphic data structures corresponding to a identifier stored in a first database; associating, by the computing system, for each of the graphic data structures, an item graphic from a second database; tagging, by a computing system, each of the graphic data structures with one or more tags, wherein the tagging comprises: determine that the client ID matches at least one member ID stored in a third database; and determine, for each of the graphic data structures, that the associated identifier has a first status, and tagging the graphic data structure with a first tag upon the determination of having the first status; and associating, by the computing system, for each of the graphic data structures based on the associated tags and matched member ID, one of a plurality of service graphics stored in a fourth database; and generating instruction for the graphic display interface having at least one of the item graphic and the service graphic for each of the plurality of graphic data structures.

Another aspect of the present disclosure is directed to a computer system for generating graphic display interface, comprising one or more processors; and memory storage media containing commands to cause the one or more processors to execute the steps of: receiving an request to generate a graphic display interface, the request comprises at least a client ID; generating a plurality of graphic data structures based on at least one of the request and a priority list, each of the graphic data structures corresponds to a identifier stored in a first database; associating for each of the graphic data structures, an item graphic from a second database; tagging each of the graphic data structures with one or more tags, the tagging comprises: determine that the client ID matches a member ID stored in a third database; and determine, for each of the graphic data structures, that the associated identifier has a first status, and tagging the graphic data structure with a first tag upon the determination of having the first status; associating for each of the graphic data structures, based on the associated tags and matched member ID, one of a plurality of badge graphic elements stored on a fourth database; generating the graphic display interface having the at least one of the item graphic and the badge graphic element for each of the plurality of graphic data structures.

Yet another aspect of the present disclosure is directed to a computer system for generating graphic display interface, comprising one or more processors; and memory storage media containing commands to cause the one or more processors to execute the steps of: receiving an request to generate a graphic display interface, the request comprises at least a client ID; generating a plurality of graphic data structures based on at least one of the request and a priority list, each of the graphic data structures corresponds to a identifier stored in a first database; associating for each of the graphic data structures, an item graphic from a second database; tagging each of the graphic data structures with one or more tags, the tagging comprises: determine that the client ID matches a member ID stored in a third database, and tagging the plurality of graphic data structures with a member tag upon the determination; determine, for each of the graphic data structures, that the associated identifier is stocked in a logistical center associated with the client ID, and tagging the graphic data structure with a first tag upon the determination of having the first status; and determine, for each of the graphic data structures, that the associated identifier is stocked in a logistical center associated with the client ID and that the client ID is associated with a qualified area, and tagging the graphic data structure with a second tag upon the determination of having the second status; associating for each of the graphic data structures, based on the associated tags, one of a plurality of badge graphic elements stored on a fourth database; generating the graphic display interface having the at least one of the item graphic and the badge graphic element for each of the plurality of graphic data structures.

Other systems, methods, and computer-readable media are also discussed herein.

BRIEF DESCRIPTION OF THE DRAWINGS

FIG. 1C depicts a sample Single Detail Page (SDP) that includes a product and information about the product along with interactive user interface elements, consistent with the disclosed embodiments.

DETAILED DESCRIPTION

Figure 1A:
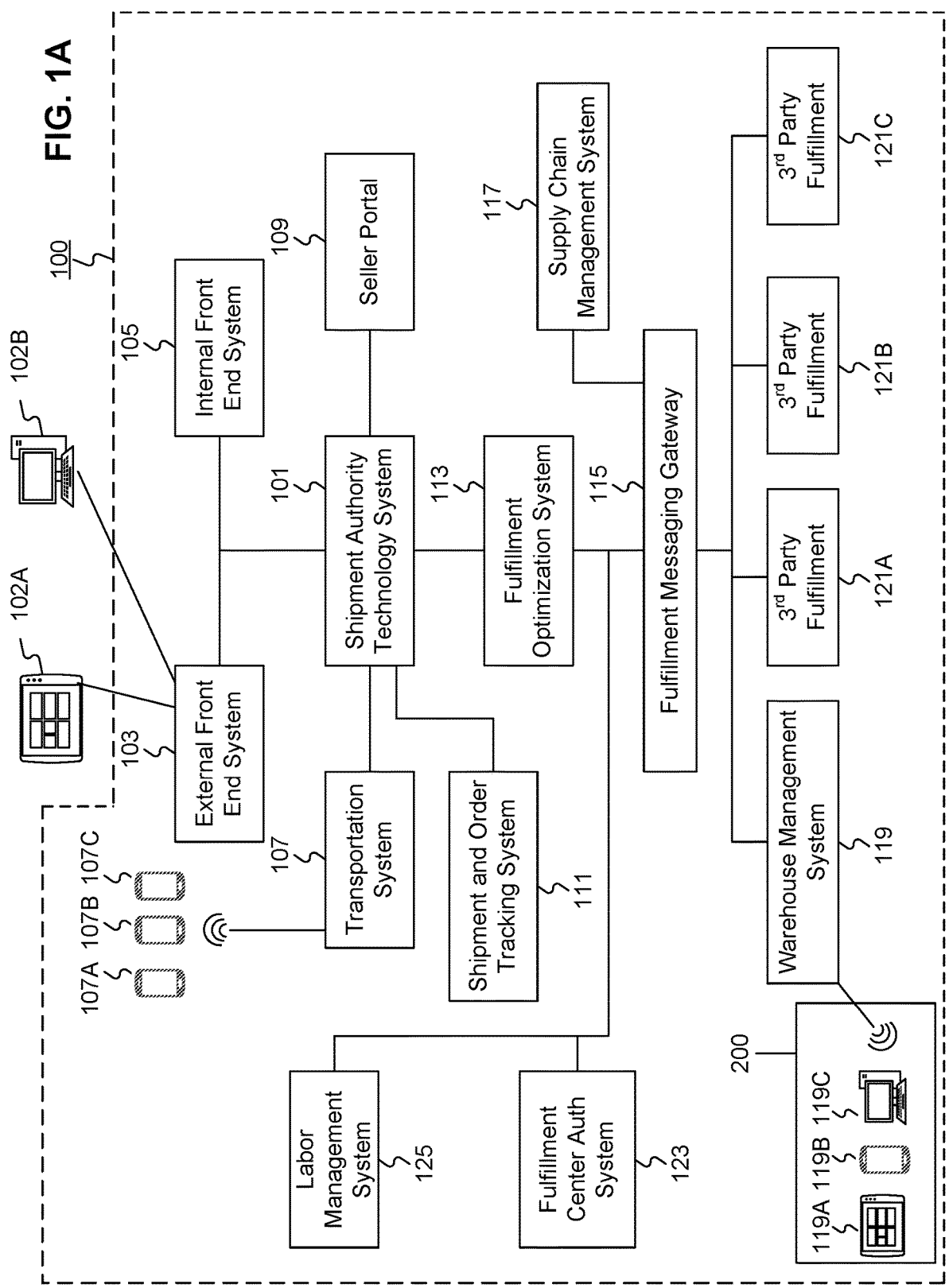
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
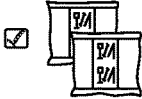
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
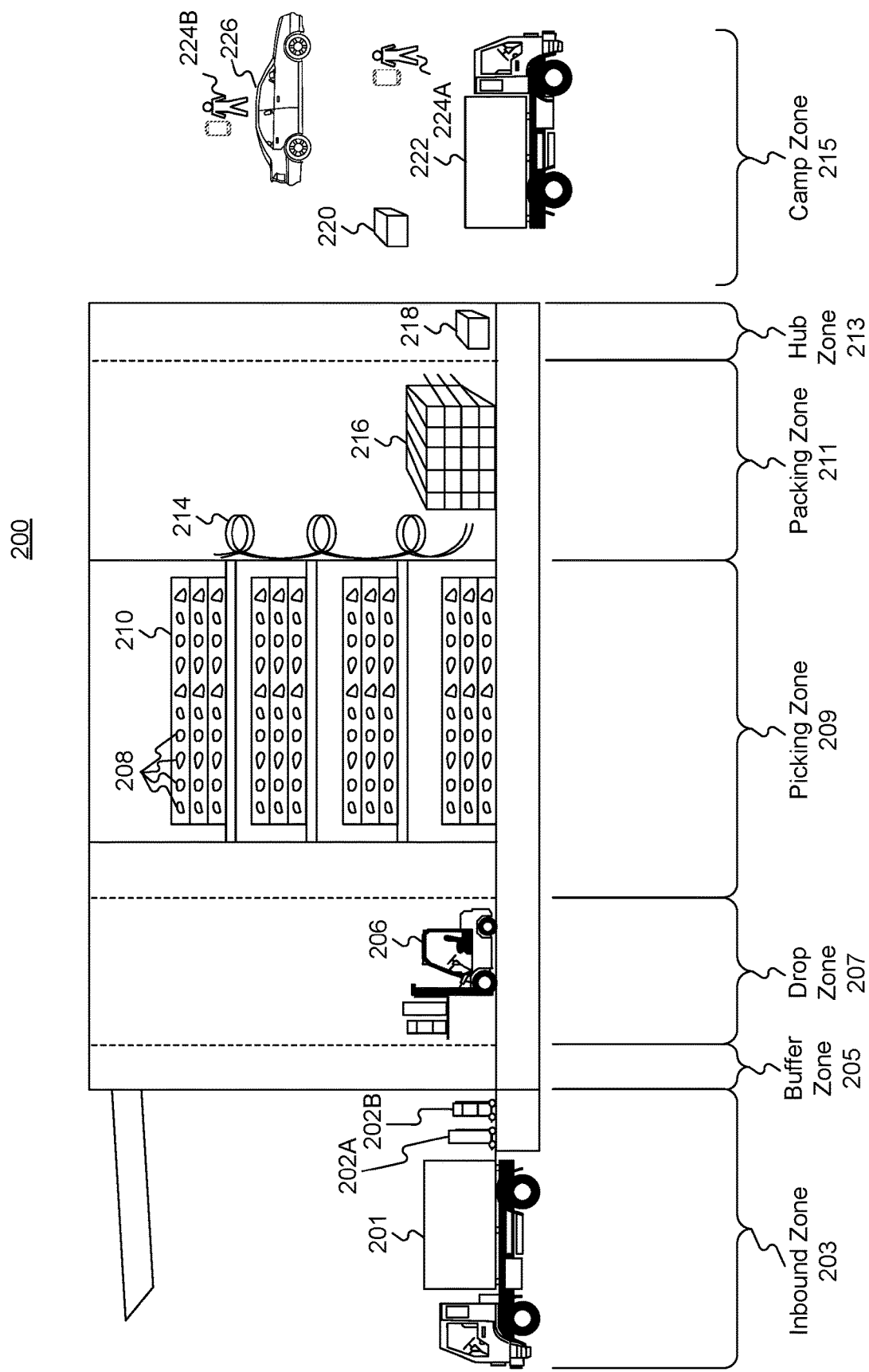
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
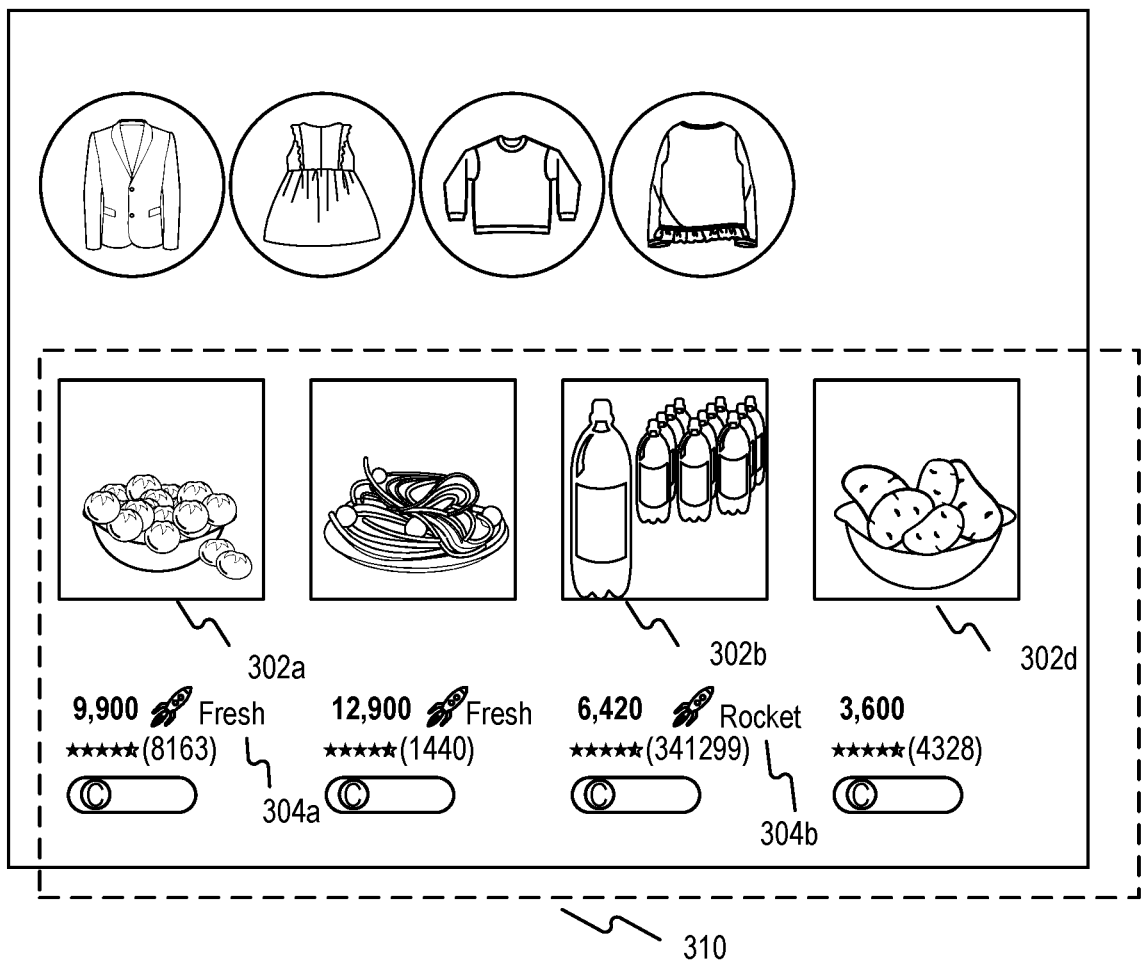
FIGS. 3A and 3B depict exemplary user interfaces, consistent with the disclosed embodiments.
Figure 3B:
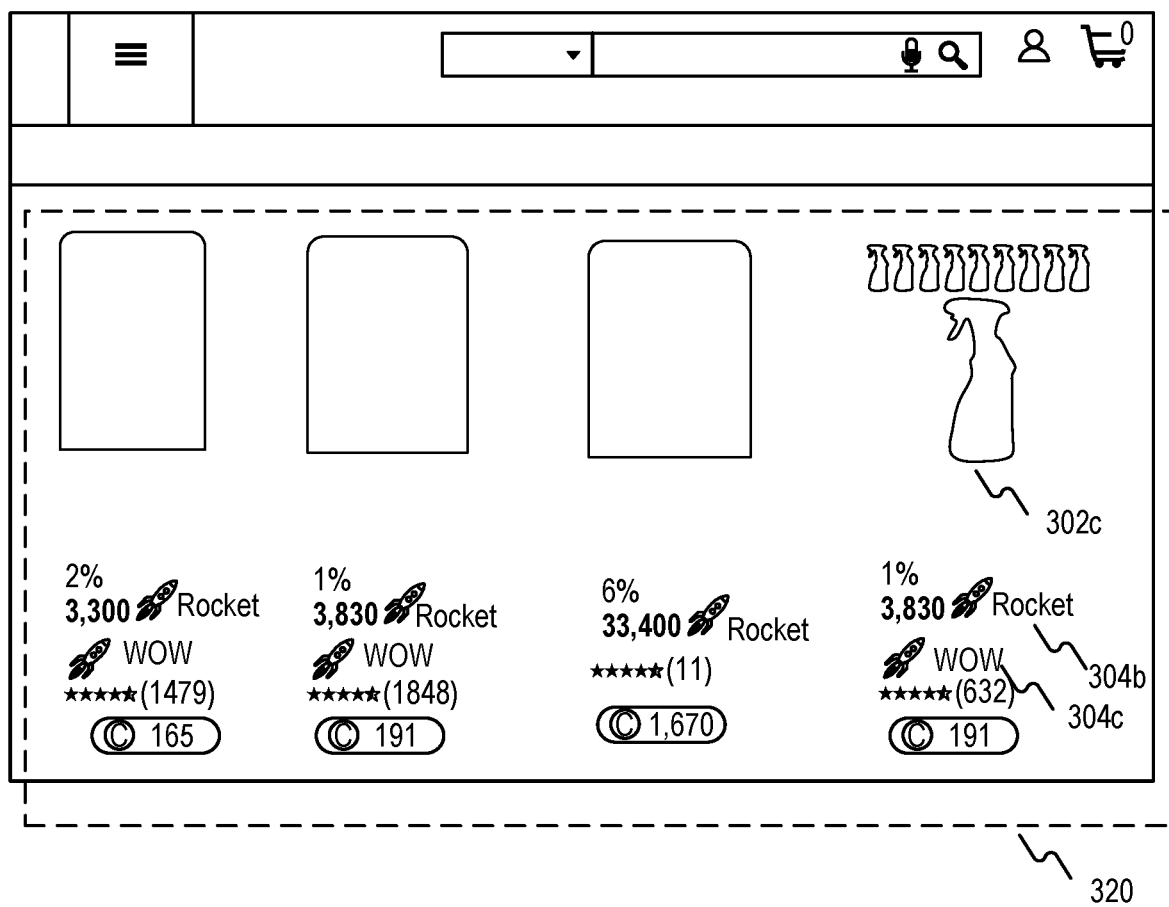

FIGS. 3A and 3B depict exemplary user interfaces, consistent with the disclosed embodiments. In some embodiments, display 300a may be a web page generated by external front end system 103 for display on user devices 102A or 102B. Display 300a may contain one or more item graphics representing items 302a, 302b, and 302d. Item graphics are the visual representations of the stock keeper units (SKU) associated with the displayed product items. For example, items 302a, 302b, and 302d may each be associated with a SKU. In some embodiments, display 300a may also contain service graphics, such as badges 304a and 304b. Service graphics may indicate one or more status of the associated SKUs.

In some embodiments, external front end system 103 may reserve a portion of display 300a to display item graphics corresponding to SKUs from a priority list. For example, the priority list may contain SKUs that are recommended to a shopper. Recommendations may be generated by system 100 based on purchase history and/or other behavior patterns of the shopper. In the illustrated example, item graphics in the display region 310 may correspond to SKUs from the priority list.

In some embodiments, different status of a SKU may correspond to different service levels, and these service levels may be represented by different service graphics. A level of service may refer different options of interaction available to shoppers with respect to a SKU, including pricing, purchasing options, refund options, delivery, warranty, and/or other interaction that a shopper may be available to the SKU. In some embodiments, the service level may be a manner of delivery of purchased SKUs.

In the example depicted in FIG. 3A, item 302*a* is a fresh produce or food item. In some cases, a fresh produce or food item may be available for delivery in using special methods, such as expedited delivery or delivery using a specially designed container for temperature control. The availability of the special delivery methods may depend on the delivery address. For example, the special delivery methods may be available in only select geographic regions. In another example, the special delivery method may be available only to a select number shoppers who obtained membership for the special delivery service. When special delivery is available for item 302*a*, badge 304*a* may appear to indicate that the service level of special delivery is available.

In another example depicted in FIG. 3A, item 302*b* may have a different status than item 302*a*. For example, item 302*b* may be an item that is in stock, but is not considered a fresh item, or that the special delivery method is not available for the shopper's address. Badge 304*b* may appear to indicate that item 302*b* has a service level that is available for immediate shipping, but not through a special delivery method.

In yet another example depicted in FIG. 3A, item 302*d* may be an item that is not stocked in any location available to the shopper. For example, item 302*d* may be an item that is not stocked at a location within a set proximity to the shopper's address. No badge graphic is present, indicating that item 302*d* does not have a service level that provide immediate shipping or special delivery methods.

In some embodiments, external front end system 103 provides instructions to generate display 300*b* in response to query received with the request, such as a search for product items. Display 300*b* may correspond to SRP of FIG. 1B. Display region 320 may represent a portion of user interface reserved to display results from the user query. In some embodiments, the priority list may be populated with SKUs based on results performed by system 100 in response to the query from the shopper. In the example depicted in FIG. 3B, item 302*c* represents one of the SKU determined by system 100 to be relevant to the shopper's query. Badge 304*b* appears next to item 302*c* to indicate that item 302*c* is stocked and available for immediate shipping. In some embodiments, external front end system 103 may generate badge 304*c* to indicate a service level of enhanced delivery.

Enhanced delivery may refer to one or more features of the on-line shopping experience. For example, SKU associated with enhanced service level may be governed by a different set of delivery, pricing and/or return policies. In some instances, SKUs associated with enhanced service level may be available for delivery the same day, or the next day. The availability of the enhanced delivery may also depend on the delivery address, and may be restricted to shoppers having a membership and being located in select geographic regions.

Figure 4:
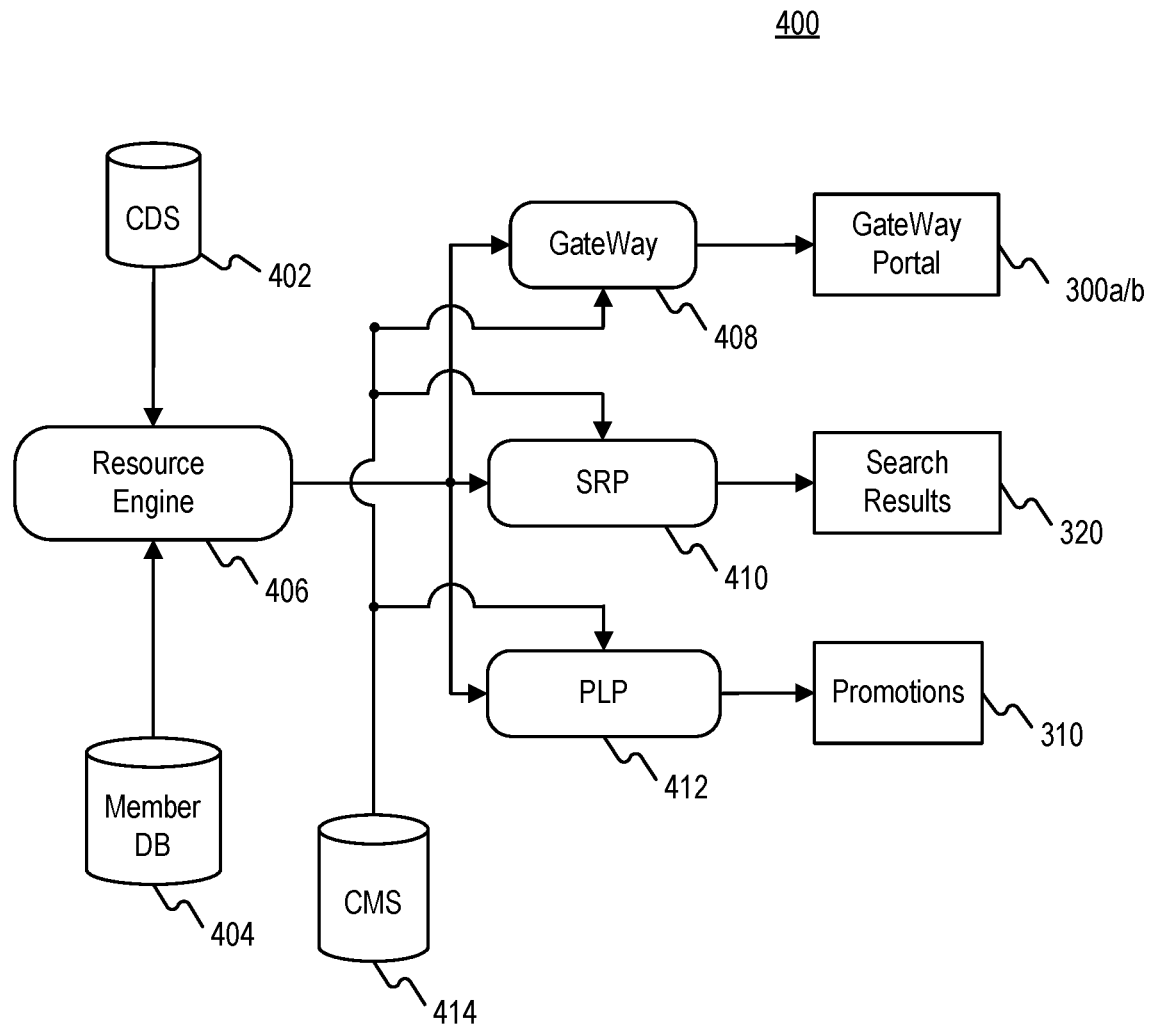
FIG. 4 depicts a schematic diagram of an exemplary system for generating user interfaces, consistent with the disclosed embodiments.

FIG. 4 illustrates a schematic diagram of a computer system for generating user interfaces, consistent with the disclosed embodiments. In some embodiments, external front end system 103 may be implemented by system 400. System 400 may comprise, or be connected to one or more databases, such as CDS 402, member DB 404, and/or CMS 414.

CDS 402 may be a memory storage for storing information relating to SKUs. For example, for each SKU, related information may include item name, storage location, inventory quantity, price, priority, reviews, product ID, shipping status, order status, and/or any other relevant information.

Member DB 404 may be a memory storage for storing information relating to shoppers. For example, data entry may be stored for customer who had shopped or had registered with system 100. Information contained in the data entry may include, name, address, membership status, order history, and/or shopping habits.

CMS 414 may be a memory storage for storing code, algorithm, graphics, web objects, and/or other resources necessary to generate user interfaces. For example, code modules for creating web pages may be stored on CMS 414, and graphic resources needed for the visual elements on the web page may also be stored on CMS 414.

In some embodiments, resource engine 406 may receive a request to generate user interfaces for display on user devices. For example, when shoppers access or load web page or mobile application of the on-line shopping business, communication is sent from user devices 102A or 102B to resource engine 406 requesting user interfaces for display. In some embodiments, the request may include a search query. In some embodiments, resource engine 406 determines the contents to be displayed on the user interface. Contents may include item graphics and service graphics corresponding to SKUs to be displayed on the user interfaces.

In some embodiments, resource engine 406 generates a plurality of graphic data structures based on at least one of the request and the priority list. The graphic data structures may be data representations of the visual elements for the user interfaces. Each graphic data structure may correspond to a SKU to be displayed. The priority list containing the SKUs and their associated information may be retrieved from CDS 402 by system 400. Resource engine 406 associates the generated graphic data structures with item graphics corresponding to the SKUs.

The priority list may include SKUs that may be determined to be especially relevant to the particular shopper, based on at least behavior profile or pattern of the shopper. Additionally, or alternatively, an on-line retailer may desire increases in sales of certain SKUs, such that the priority list may contain these SKUs so that they will be presented to shoppers for viewing whenever possible.

In some embodiments, graphic data structures may correspond to SKU based on requests from the user device. For example, when a shopper browses through web pages for a certain category of products, graphic data structures may correspond to SKUs belong to the category of product. These SKUs may be pre-determined and correspond to the particular user interface being requested for display. For instances, a user interface for an apparels section may be have a pre-determined SKUs of clothing items for display. The pre-determined SKUs may be fixed for given time period, such months, days, or hours. In some embodiments, the request includes search queries for one more SKU stored in databases (e.g. CDS 402). Priority list may also contain SKUs returned from the search results based on the search queries.

Resource engine 406 may tag the graphic data structures with one or more status. Tag, or tagging, as used herein, refers to manipulating a value of information data. For example, resource engine 406 may tag the graphic data structures by assigning one or more values of the graphic data structure. In some embodiments, the graphic data structure may have a value indicating a member status based on the user device. The member status may relate to the shopper's identity. For example, shoppers who registered with the retailer or has previously shopped may have client IDs. The client ID is transmitted from user device 102A or 102B to system 100. Resource engine 406 may determine that if the client ID matches at least one member ID stored in a database (e.g. member DB 404), the graphic data structures generated for the shopper may be tagged with a member status. The member status may indicate the level of service that the shopper is afforded.

In some embodiments, the graphic data structure may have an inventory status. The inventory status may indicate that a particular SKU is ready for shipping. In some embodiments, SKUs stocked in logistical centers (e.g., FC 200) within a proximity to a shipping address may be immediately packaged and shipped once an order has been received. These SKUs may arrive at the shopper's address with relatively few delays. In contrast, SKUs not stocked at logistical centers within a proximity to a shipping address would have to first arrive at these logistical centers, or be shipped from a third party location. Thus unstocked items may experience longer or unpredictable shipping time, and would not be tagged with the inventory status. Resource engine 406 may access information relating to a SKU from CDS 402, and determine whether the graphic data structure corresponding to the SKU would be tagged with an inventory status.

In some embodiments, the graphic data structures may have a service status. The service status may indicate that enhanced delivery or special delivery is available for a particular SKU. In some embodiments, resource engine 406 may determine that the graphic data structure has a service status when the corresponding SKU qualifies for enhanced service with respect to the client ID.

In some embodiments, based on the tags, resource engine 406 associates the graphic data structures with service graphics. Service graphics are visual elements that provides indication to the shopper the different service levels of the SKUs displayed in the user interfaces. The tags of the graphic data structures indicates which service graphic should be displayed. In embodiments, the service graphics may be stored in CMS 414.

In some embodiments, resource engine 406 outputs the graphic data structure to Gateway 408 to provide instructions for transmission to user devices to generate user interfaces for display. Instructions may include computer code, images, graphics, web objects, and/or other data needed for generating user interfaces by user devices for generating user interfaces. In some embodiments, based on the graphic data structures, gateway 408 determines the SKUs to be included on the user interfaces, and any visual elements associated with the SKUs. In some embodiments, the user interfaces may be display 300a/b depicted in FIGS. 3A and 3B. In some embodiments, resource engine 406 may also output graphic data structures to SRP 410 and PLP 412. SRP 410 provides instructions to generate a search result on the user interface based on the graphic data structures, such as search display region 320 depicted in FIG. 3B. PLP 412 may provide instructions to generate recommendations on the user interfaces, such as display region 310 depicted in FIG. 3A.

Figure 5:
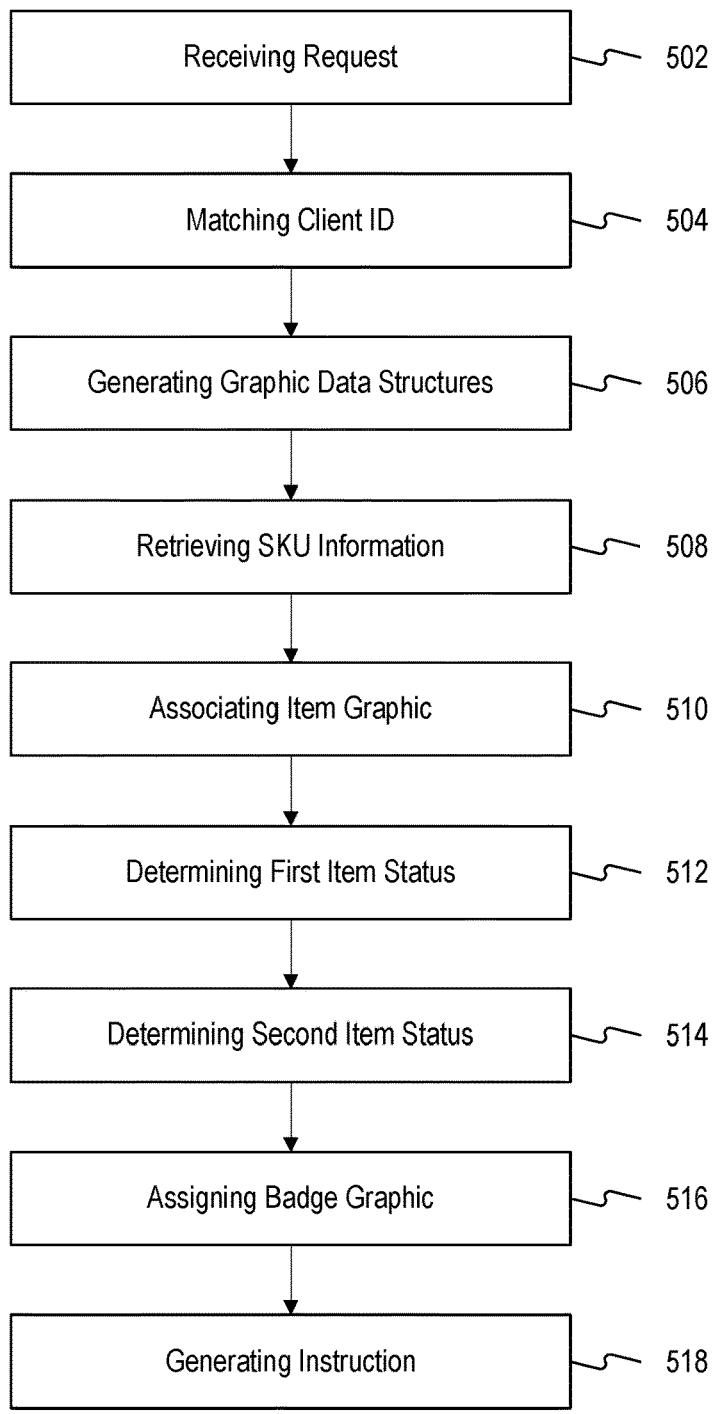
FIG. 5 depicts a flow chart of an exemplary process for generating user interfaces, consistent with the disclosed embodiments.

FIG. 5 depicts a flow chart of an exemplary process for generating user interfaces, consistent with the disclosed embodiments. One or more steps on process 500 may be implemented by resource engine 406.

In step 502, resource engine 406 receives request for generating user interfaces for display on user devices. The user interface forms part of a web page or an interface of a software application. In some embodiments, the request may contain at least a client ID. The client ID may be information associated with the user device, or with the user. The client ID may be an IP address, device identifier, a customer number, an order number, or other similar identifying information. In some embodiments, the request may contain a query. A query may be a search for specific SKUs stored in one or more databases connected to system resource engine 406.

In step 504, system 400 matches the client ID received from the user devices with information stored in one or more databases (e.g., member DB 404). When a client ID is received with the request, the client ID may be used to identify the user based on existing information stored in the one or more databases.

In step 506, resource engine 406 generates one or more graphic data structures. The graphic data structures are the data representations of the SKUs to be displayed on the user interfaces. In some embodiments, resource engine 406 generates graphic data structures based on a priority list. The priority list may contain a predetermined selection of SKU based on the specific user interface requested. The priority list may also contain SKUs that are dynamically chosen based on the client ID, such as recommendations for a particular user, or a promotional items marketed at the particular user. In some embodiments, when the request contains search queries, the priority list may also include SKUs from the result of that search. In some embodiments, the priority list containing the SKUs and associated information may be retrieved from CDS 402.

In step 508, resource engine 406 associates the graphic data structures with corresponding SKU information. Resource engine 406 may retrieve these information from one or more databases (e.g. CDS 402). The information may include one or more status of the SKUs, such as the inventory information (e.g. quantities or locations of where SKUs are stored).

In step 510, resource engine 406 associates the graphic data structures with corresponding item graphics. Item graphics may be the visual elements associated with the SKUs. These may include logo, text, photo, image, or other media data corresponding to each SKU. The item graphics may be retrieved from one or more databases (e.g. CDS 402 or CMS 404).

In step 512, resource engine 406 determines a first item status for each graphic data structure. In some embodiments, the first status may be the inventory status. The inventory status may be based on whether the corresponding SKU is currently stocked at relevant logistical centers. A relevant logistical center may be a shipping departing point, such as FC 200, that is located in a predefined area within shipping address from the user. For example, if a SKU of a corresponding graphic data structure is stocked at a relevant logistical center, resource engine 406 tags the graphic data structure with the first item status. In some embodiments, the first item status may optionally include the member status.

The member status may be determined based on whether the client ID matches with a member profile stored in one or more databases (e.g. member DB 404).

In step 514, resource engine 406 determines a second item status. The second item status may include the service status. The service status may be based on what service level for the corresponding SKU is available to the user. The determination may be based on whether the user's shipping address is within a qualifying area, and whether SKU is stocked in a logistical center in the same qualifying area. In some embodiments, the service level may include enhanced delivery. In some embodiments, the service level may include delivery of fresh/food items in special packaging.

In step 516, resource engine 406 assigns badge graphics to each graphic data structure. The badge graphics may be visual elements stored in one or more databases (e.g. CMS 414). In some embodiments, the badge graphics may be assigned based on the first item status and/or the second item status. Step 516 will be described in further detail below with reference to FIG. 6.

In step 518, resource engine 406 generates instructions for generating user interfaces for display. The instructions may include graphic data structures, as well as associated data, codes and scripts for transmission to the user devices. Examples of the user interfaces may be the Search Result Page (SRP) illustrated in FIG. 1B, or Single Detail Page illustrated in FIG. 1C.

Figure 6:
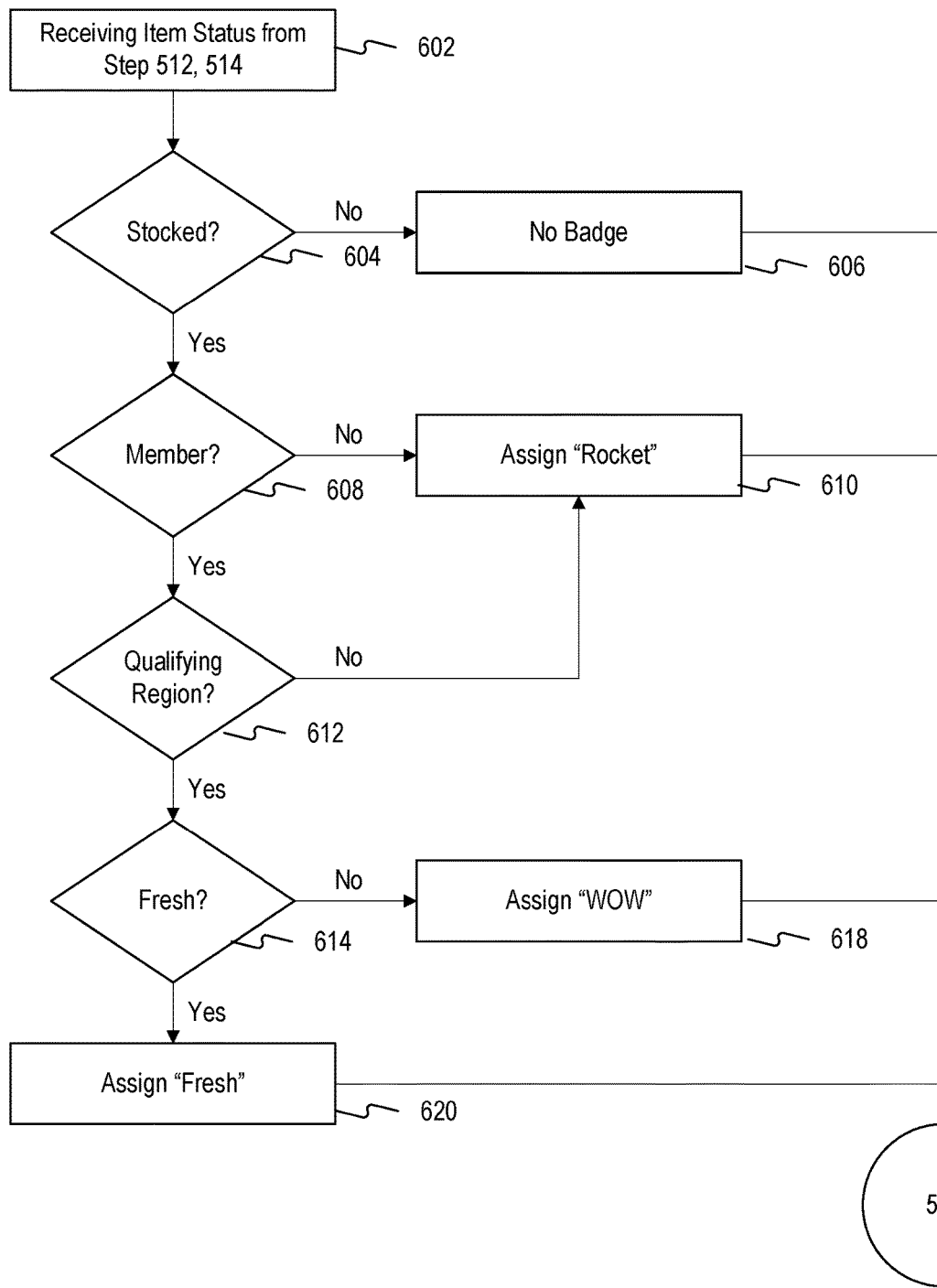
FIG. 6 depicts a flow chart of an exemplary process for configuring graphic elements, consistent with the disclosed embodiments.

FIG. 6 depicts a flow chart of an exemplary process for configuring graphic elements by resource engine 406, consistent with the disclosed embodiments. Steps of process 600 describes the operations of resource engine 406 in step 516 illustrated in FIG. 5.

In step 602, resource engine 406 determines item status of each graphic data structure in step 512 and 514, as described above. The item status may include the member status, the inventory status, and the service status. The service status may further specify whether the service status is 'fresh.'

In step 604, if the graphic data structure is tagged with the inventory status, then "Stocked?" is "Yes," and process 600 proceeds to step 608. If the graphic data structure is not tagged with inventory status, then "Stocked?" is "No," and process proceeds to step 606, where resource engine 406 does not assign any badge graphic to the graphic data structure.

In step 608, if the graphic data structure is tagged with the member status then "Member" is "Yes," and process 600 proceeds to step 612. If the data structure is not tagged with the member status, then "Member?" is "No," and process 600 proceeds to step 610, where the graphic data structure is assigned "Rocket" badge. "Rocket" refers to a service level of a SKU indicating that the SKU is stocked in a relevant logistical center, and is ready for immediate shipping. Example of the Rocket badge may be badge 304b. Other types of statuses and badges are possible in various embodiments. In some embodiments, step 608 is optional, and may be skipped.

In step 612, if the graphic data structure is tagged with the service status, then "Qualifying Region?" is "Yes," and process 600 proceeds to step 614. If the graphic data structure is not tagged with the service status, then "Qualifying Region?" is "No," and process proceeds to step 610, where resource engine 406 the graphic data structure is assigned "Rocket" badge. Qualifying region may refer to a geographic area where one or more additional service levels may be available.

In step 614, if the service status of the graphic data structure indicates a fresh delivery, then "Fresh?" is "Yes," and process 600 proceeds to step 620, where resource engine 406 assigns "Fresh" badge to the graphic data structure. "Fresh" refers to a service level available to a SKU indicating that the SKU is fresh/food product, and that it is available for delivery in a special packaging and/or expedited delivery. Other types of service levels and badges are possible in various embodiments. An example of the Fresh badge may be badge 304a.

If the service status of the graphic data structure does not indicate a fresh delivery, then "Fresh?" is "No," and process 600 proceeds to step 618, where the graphic data structure is assigned "WOW" badge. "WOW" refers a service level available to a SKU indicating that is enhanced. Enhanced service may include delivery on the same day, or the next day, or other preferential services regarding pricing, return, warranty, and/or other customer service features. Other types of service levels and badges are possible in various embodiments. Example of the WOW badge may be badge 304c.

Process 600 proceeds to step 518 once badge graphics are assigned.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for generating graphic display interface, comprising:
   receiving, by a computing system, a request to generate a graphic display interface, the request comprising at least a client ID;
   generating, by the computing system, a plurality of graphic data structures based on at least one of the request and a priority list associated with a purchase history, each of the graphic data structure corresponding to an identifier stored in a first database, wherein the identifier is associated with one or more products;
   associating, by the computing system, for each of the graphic data structures, an item graphic from a second database, wherein the item graphic is a graphical depiction of the product;
   tagging, by a computing system, each of the graphic data structures with one or more tags, wherein the tagging comprises:
      determining that the client ID matches at least one member ID stored in a third database, and tagging the plurality of graphic data structures with a member tag upon the determination;
      determining, for each of the graphic data structures, that the associated identifier has a first status associated with being stocked in a logistical center, and tagging the graphic data structure with a first tag upon the determination of having the first status; and
      determining, for each of the graphic data structures, that the client ID has a second status associated with a geographic region, and tagging the graphic data structures with a second tag upon the determination of having the second status;
   associating, by the computing system, for each of the graphic data structures based on the associated tags and matched member ID, one of a plurality of service graphics stored in a fourth database; and
   generating instruction for the graphic display interface having at least one of the item graphic and the service graphic for each of the plurality of graphic data structures.

2. The method of claim 1, wherein the item graphic comprises at least one of an image, photo, or text associated with associated with the identifier.

3. The method of claim 1, wherein the service graphic comprise one of a first badge graphic and a second badge graphic.

4. The method of claim 3, wherein the first badge graphic is associated with the first tag.

5. The method of claim 3, wherein the second badge graphic is associated with the second tag.

6. The method of claim 1, wherein when the generating is based on the priority list, the priority list comprises identifiers stored in the first database.

7. The method of claim 1, wherein the request comprises a search query.

8. The method of claim 1, wherein the first, the second, the third, or the fourth databases are part of the same datastore.

9. The method of claim 1, wherein the graphic display interface does not contain the badge graphic for graphic data structures not associated with any one of the member tag, the first tag, or the second tag.

10. A computer system for generating graphic display interface, comprising one or more processors; and
    memory storage media containing commands to cause the one or more processors to execute the steps of:
       receiving a request to generate a graphic display interface, the request comprises at least a client ID;
       generating a plurality of graphic data structures based on at least one of the request and a priority list associated with a purchase history, each of the graphic data structures corresponds to a identifier stored in a first database, wherein the identifier is associated with one or more products;
       associating, for each of the graphic data structures, an item graphic from a second database, wherein the item graphic is a graphical depiction of the product;
       associating for each of the graphic data structures, an item graphic from a second database;
       tagging each of the graphic data structures with one or more tags, the tagging comprises:
          determining that the client ID matches a member ID stored in a third database, and tagging the plurality of graphic data structures with a member tag upon the determination;
          determining, for each of the graphic data structures, that the associated identifier has a first status associated with being stocked in a logistical center, and tagging the graphic data structure with a first tag upon the determination of having the first status; and
          determining, for each of the graphic data structures, that the client ID has a second status associated with a geographic region, and tagging the graphic data structures with a second tag upon the determination of having the second status;
       associating for each of the graphic data structures, based on the associated tags and matched member ID, one of a plurality of badge graphic elements stored on a fourth database;
       generating the graphic display interface having the at least one of the item graphic and the badge graphic element for each of the plurality of graphic data structures.

11. The system of claim 10, wherein the item graphic comprises at least one of an image, photo, or text associated with associated with the identifier.

12. The system of claim 10, wherein the badge graphic element comprise one of a first badge graphic and a second badge graphic.

13. The system of claim 12, wherein the first badge graphic is associated with the first tag.

14. The system of claim 12, wherein the second badge graphic is associated with the second tag.

15. The system of claim 10, wherein when the generating is based on the priority list, the priority list comprises identifiers stored in the first database.

16. The system of claim 10, wherein the request comprises a search query.

17. The system of claim 10, wherein the first, the second, the third, or the fourth databases are part of the same datastore.

18. The system of claim 10, wherein the graphic display interface does not contain the badge graphic element for graphic data structures not associated with any one of the member tag, the first tag, or the second tag.

19. A computer system for generating graphic display interface, comprising one or more processors; and
    memory storage media containing commands to cause the one or more processors to execute the steps of:
       receiving a request to generate a graphic display interface, the request comprises at least a client ID;
       generating a plurality of graphic data structures based on at least one of the request and a priority list associated with a purchase history, each of the graphic data structures corresponds to a identifier stored in a first database;

associating for each of the graphic data structures, an item graphic from a second database;

tagging each of the graphic data structures with one or more tags, the tagging comprises:

determine that the client ID matches a member ID stored in a third database, and tagging the plurality of graphic data structures with a member tag upon the determination;

determine, for each of the graphic data structures, that the associated identifier is stocked in a logistical center associated with the client ID, and tagging the graphic data structures with a first tag upon the determination of having the first status; and determine, for each of the graphic data structures, that the associated identifier is stocked in a logistical center associated with the client ID and that the client ID is associated with a geographic region, and tagging the graphic data structures with a second tag upon the determination of having the second status;

associating for each of the graphic data structures, based on the associated tags, one of a plurality of badge graphic elements stored on a fourth database;

generating the graphic display interface having the at least one of the item graphic and the badge graphic element for each of the plurality of graphic data structures.

* * * * *